(12) United States Patent
Pontier et al.

(10) Patent No.: US 8,924,887 B2
(45) Date of Patent: Dec. 30, 2014

(54) ZERO TOUCH EXPLORATION FOR MOBILE DEVICE

(71) Applicants: Laurent Pontier, Bailly (FR); Ali Meziani, Herblay (FR); Valdrin Koshi, Paris (FR)

(72) Inventors: Laurent Pontier, Bailly (FR); Ali Meziani, Herblay (FR); Valdrin Koshi, Paris (FR)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 13/633,377

(22) Filed: Oct. 2, 2012

(65) Prior Publication Data
US 2014/0096073 A1 Apr. 3, 2014

(51) Int. Cl.
*G06F 3/14* (2006.01)

(52) U.S. Cl.
USPC ............. 715/788; 715/700; 345/1.1; 345/156

(58) Field of Classification Search
CPC ..................................... G06F 3/14; G06F 3/17
USPC .......... 715/200–277, 700–867; 700/701–866; 709/201–229; 705/50–79; 345/1.1, 345/30–111, 156
See application file for complete search history.

(56) References Cited

U.S. PATENT DOCUMENTS 7,453,418 B2 * 11/2008 Palmquist ...................... 345/1.1
2008/0122785 A1 * 5/2008 Harmon ........................ 345/156

* cited by examiner

*Primary Examiner* — Ruay Ho
(74) *Attorney, Agent, or Firm* — Buckley, Maschoff & Talwalkar LLC

(57) ABSTRACT

A system includes determination of a layout of graphical representations of dataset members displayed by a display device of the apparatus, determination of a plurality of display device movements to monitor based on the layout, detection of one of the plurality of display device movements, and execution of an action associated with the detected movement on at least one of the graphical representations.

15 Claims, 17 Drawing Sheets

ZERO TOUCH EXPLORATION FOR MOBILE DEVICE

BACKGROUND

A mobile computing device may display data to a user. In order to explore the data, the user may use a miniature keyboard or a touchscreen of the device to input associated commands and/or data to the device. These modalities are currently not efficient, suitable or intuitive in some usage scenarios.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
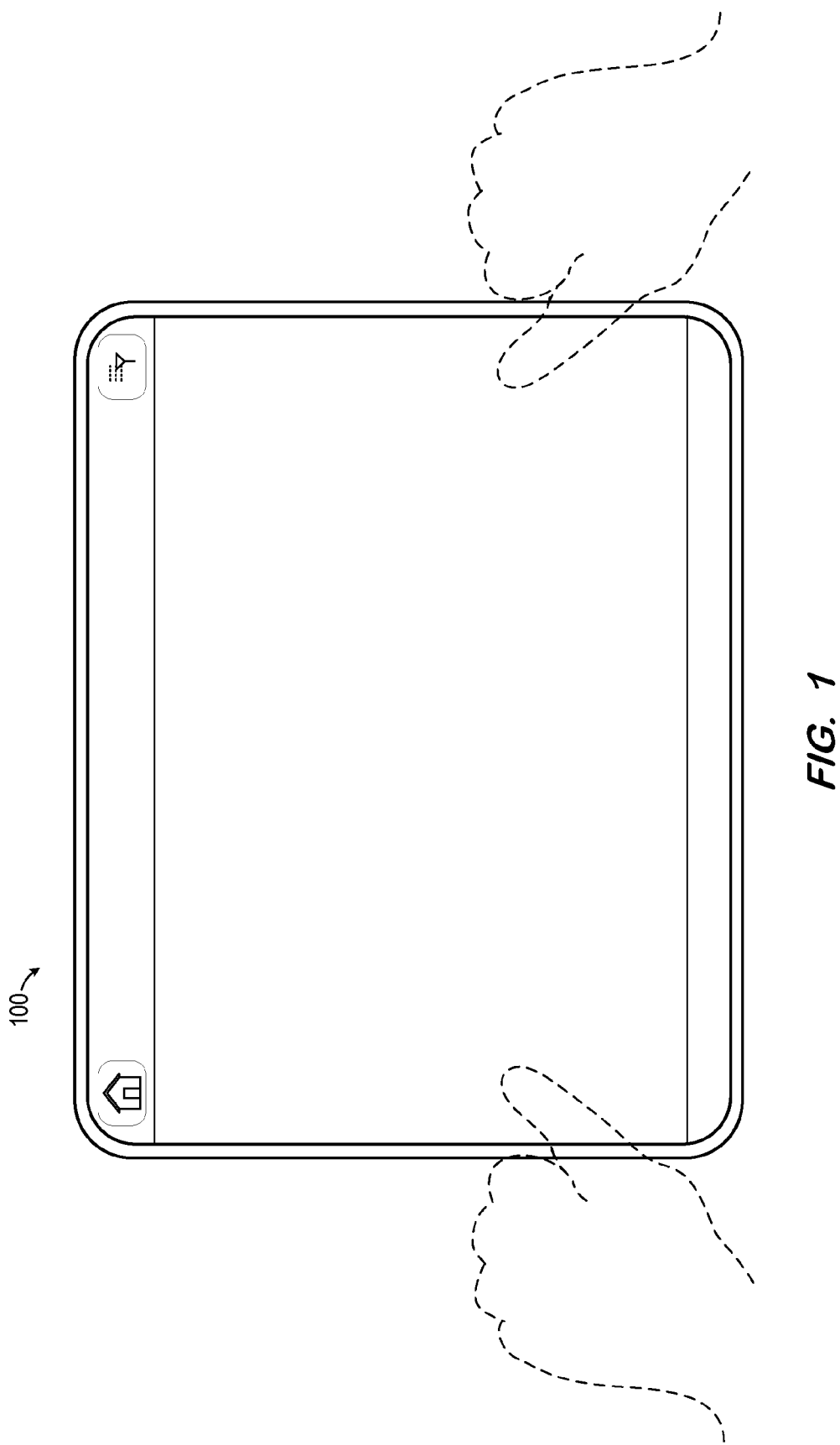
FIG. 1 is an outward view of an apparatus according to some embodiments.

FIG. 1 is a perspective view of apparatus 100 according to some embodiments. Apparatus 100 may comprise a tablet computer, a smartphone, a laptop or netbook computer, and/or any other device or devices suitable to perform all or a part of the functions described herein. Apparatus 100 may include a display device to present visualizations and a touch-sensitive input surface to receive input at one or more portions of the visualizations, although some embodiments do not include such a touch-sensitive input surface.

Figure 2:
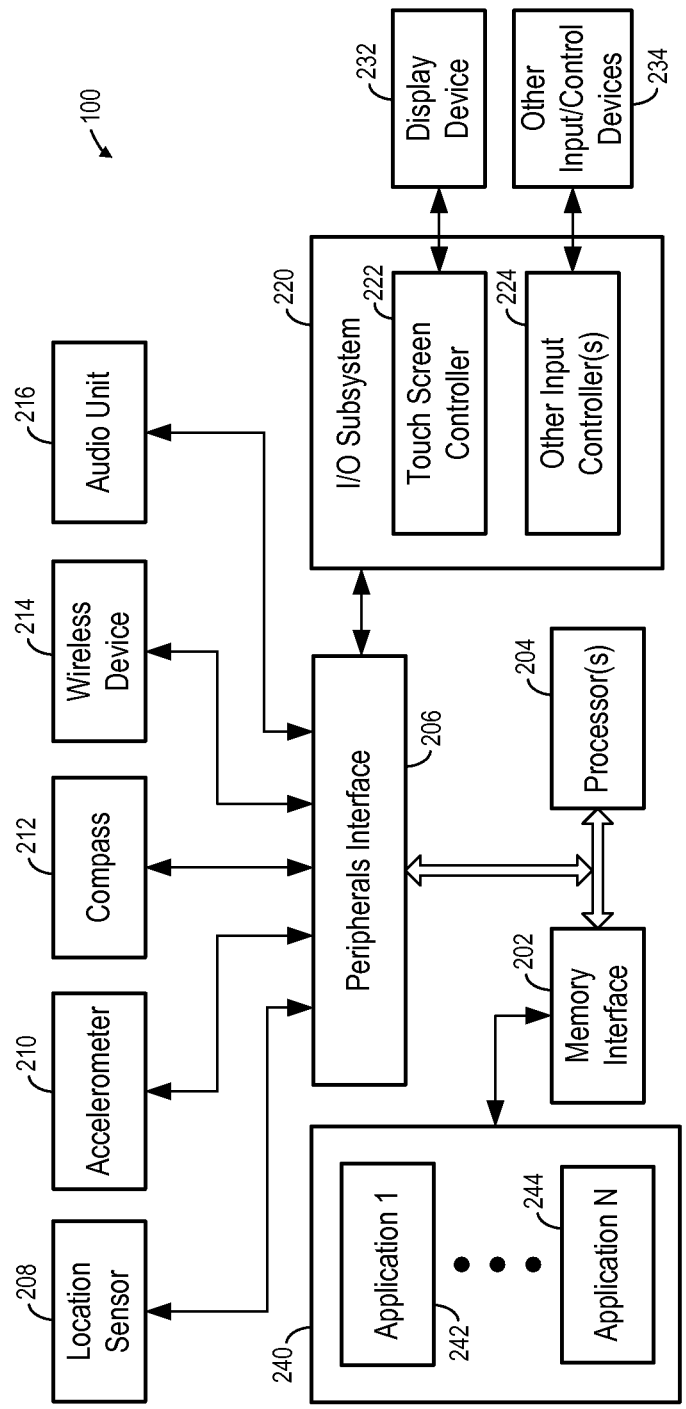
FIG. 2 is a block diagram of an architecture of an apparatus according to some embodiments.

According to some embodiments, and as will be described in detail below, a display device of apparatus 100 may display a layout of graphical representations of dataset members. A user may move apparatus 100 in order to select a particular one of the graphical representations and/or to explore a dataset member represented by a selected graphical representation. Apparatus 100 therefore includes hardware and software usable to detect movement thereof FIG. 2 is a block diagram of an architecture of apparatus 100 according to some embodiments, and embodiments are not limited thereto. Apparatus 100 includes memory interface 202, one or more processors (e.g., microcontrollers, image processors and/or central processing units) 204, and peripherals interface 206. Memory interface 202, one or more processors 204 and/or peripherals interface 206 may comprise separate components or can be integrated within one or more integrated circuits. The various components in apparatus 200 may be coupled to one another by one or more communication buses or signal lines.

Sensors, devices and subsystems are coupled to peripherals interface 206 to facilitate multiple functionalities. For example, location sensor 208, accelerometer 210, compass 212, wireless device 214, and audio unit 216 may be provided to facilitate the collection, use and interaction with data and information and to achieve the functionality described herein.

Location sensor 208 may include circuitry and sensors for supporting a location determining capability, such as that provided by the Global Positioning System or other positioning system (e.g., systems using Wi-Fi access points, television signals, cellular grids, Uniform Resource Locators (URLs)).

Accelerometer 210 may provide information indicating movement and/or orientation of apparatus 100, as is known in the art. As will be described below, the detection of movement based on this information may trigger execution of user interface actions according to some embodiments. Compass 212 may determine an orientation of apparatus 100 with respect to compass headings and may therefore also be used in some embodiments to detect movement as changes in orientation.

Wireless device 214 may include one or more wireless communication subsystems, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

Audio unit 216 may include a speaker and a microphone to facilitate voice-enabled functionalities, such as phone and voice mail functions. In some implementations, additional peripherals, sensors or subsystems (e.g., a camera, a photoelectric device, and a proximity sensor) may be coupled to peripherals interface 206 via connectors such as, for example a Universal Serial Bus (USB) port, or a docking port, or some other wired port connection.

I/O subsystem 220 may include touch screen controller 222 and/or other input controller(s) 224. Touch-screen controller 222 may be coupled to display device 232. Display device 232 and touch screen controller 222 may, for example, detect contact (i.e., touch input), movement (i.e., drag input) and release thereof using any of a plurality of touch-sensitivity technologies, including but not limited to capacitive, resistive, infrared, and surface acoustic wave technologies, as well as other proximity sensor arrays or other elements for determining one or more points of contact with display device 232. Other input controller(s) 224 may be coupled to other input/ control devices 234, such as one or more buttons, rocker switches, thumb-wheel, infrared port, USB port, and/or a pointer device such as a stylus.

Memory interface 202 is coupled to memory 240. Memory 240 can include high-speed random access memory and/or non-volatile memory, such as one or more magnetic disk storage devices, one or more optical storage devices, and/or flash memory (e.g., NAND, NOR). Memory 240 may store program code of application programs 242-244 which may be executed by processors 204 to cause apparatus 200 to perform the functions described herein.

Memory 240 can store an operating system, such as Android, Darwin, RTXC, LINUX, UNIX, OS X, WINDOWS, or an embedded operating system such as VxWorks. The operating system may include instructions for handling basic system services and for performing hardware dependent tasks. In some embodiments, the operating system can be a kernel (e.g., UNIX kernel). Memory 240 may also store data, including but not limited to documents, images, video files, audio files, and other data.

Figure 3:
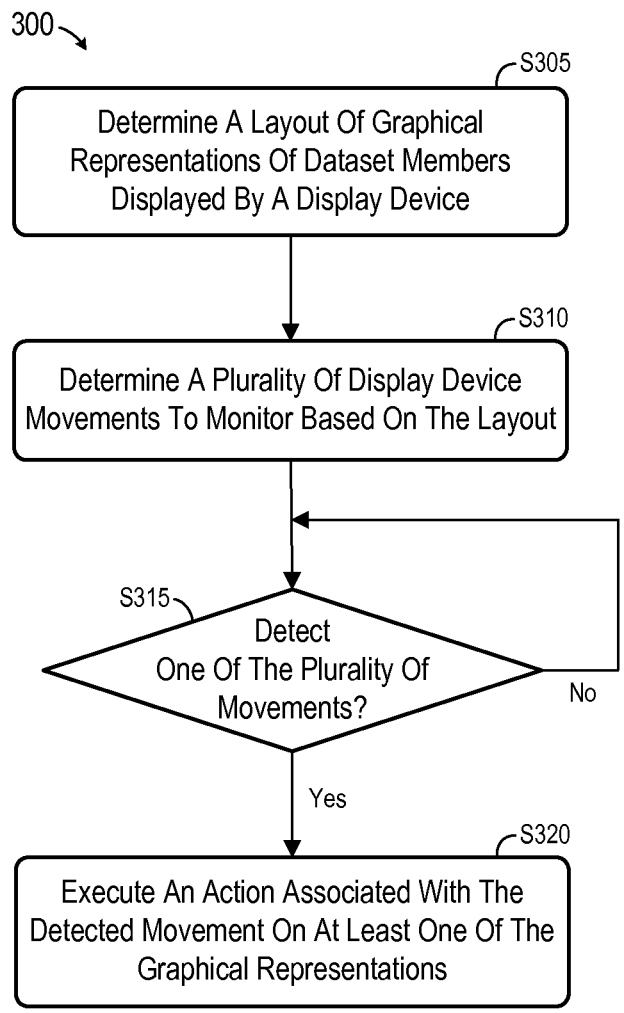
FIG. 3 is a flow diagram of a process according to some embodiments.

FIG. 3 comprises a flow diagram of process 300 according to some embodiments. Process 200 and all other processes mentioned herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 4:
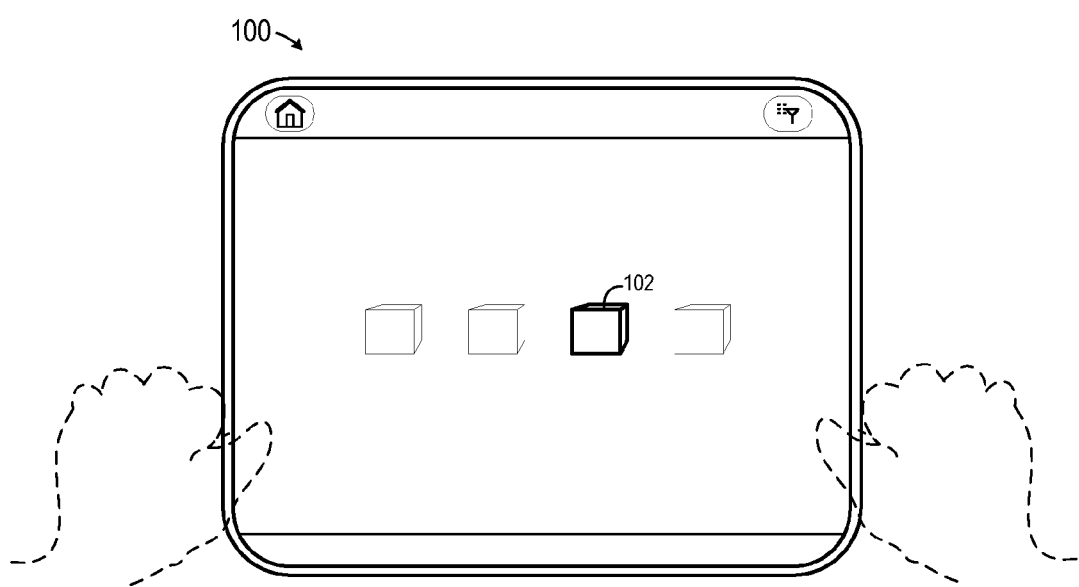
FIG. 4 is an outward view of an apparatus displaying graphical representations according to some embodiments.

Prior to process 300, it will be assumed that a display device of an apparatus displays graphical representations of dataset members. FIG. 4 is an outward view of apparatus 100 showing the display of four graphical representations. Each of the graphical representations is associated with a respective dataset member. Graphical representation 102 is "selected", as indicated by its bold outline.

Embodiments are not limited to the particular graphical representations shown in FIG. 4. Any one or more types of graphical representations may be displayed. Embodiments are also not limited to any particular graphical mechanism for indicating selection of a graphical representation.

The represented dataset members may consist of any type of data that is or becomes known. In one particular example, the dataset members are sales figures for different geographic regions. In some embodiments, apparatus 100 executes an application to retrieve the sales figures from memory 240 and to display corresponding graphical representations on display device 232.

Figure 5:
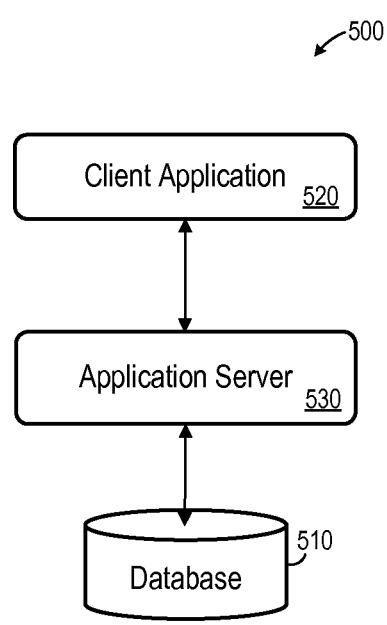
FIG. 5 is a block diagram of a system architecture according to some embodiments.

In some embodiments, the dataset members may be retrieved from a remote back-end system, but embodiments are not limited thereto. FIG. 5 is a block diagram of system 500 according to some embodiments. In operation, client application 520 is executed by apparatus 100 and sends a request for sales figures to application server 530. In response, application server 530 retrieves the requested figures from database 510 and returns them to client application 520 for display.

Database 510 may comprise any one or more systems to store data. The data stored in database 510 may be received from disparate hardware and software systems, some of which are not interoperational with one another. The systems may comprise a back-end data environment employed in a business or industrial context. The data may be pushed to database 510 and/or provided in response to queries received therefrom.

In some embodiments, database 510 is implemented in Random Access Memory (e.g., cache memory for storing recently-used data) and one or more fixed disks (e.g., persistent memory for storing their respective portions of the full database). Alternatively, database 510 may implement an "in-memory" database, in which volatile (e.g., non-disk-based) memory (e.g., Random Access Memory) is used both for cache memory and for storing its entire respective portion of the full database. In some embodiments, the data of the full database may comprise one or more of conventional tabular data, row-based data, column-based data, and object-based data. Database 510 may also or alternatively support multi-tenancy by providing multiple logical database systems which are programmatically isolated from one another. Moreover, the data of database 510 may be indexed and/or selectively replicated in an index.

According to some embodiments, database 510 executes a database server process to provide data to database applications. More specifically, database 510 may communicate with one or more database applications executed by application server 530 over one or more interfaces (e.g., a Structured Query Language (SQL)-based interface) in order to provide data thereto.

Application server 530 may execute database applications to provide, for example, business reporting, inventory control, online shopping, and/or any other suitable functions. The database applications may, in turn, support client applications executed by end-user devices (e.g., desktop computers, laptop computers, tablet computers, smartphones, etc.). Such a client application may comprise a rich client application, an applet in a Web browser, or any other application to access and display interfaces generated by a database application.

Returning to process 300, a layout of graphical representations is determined at S305. As described above, the graphical representations represent dataset members displayed by a display device. Next, at S310, a plurality of display device movements to monitor are determined based on the layout. Accordingly, the layout of the graphical representations dictates the set of movements which are subsequently monitored. Examples and further detail of each step of process 300 are provided below.

Flow pauses at S315 until one of the plurality of display device movements is detected. In response, an action associated with the detected movement is executed at S320. The action is executed upon at least one of the graphical representations. According to some embodiments, each of the monitored plurality of movements is associated with a different respective action. Therefore, the particular action which is executed depends entirely on which of the monitored plurality of movements is detected.

Figure 6A:
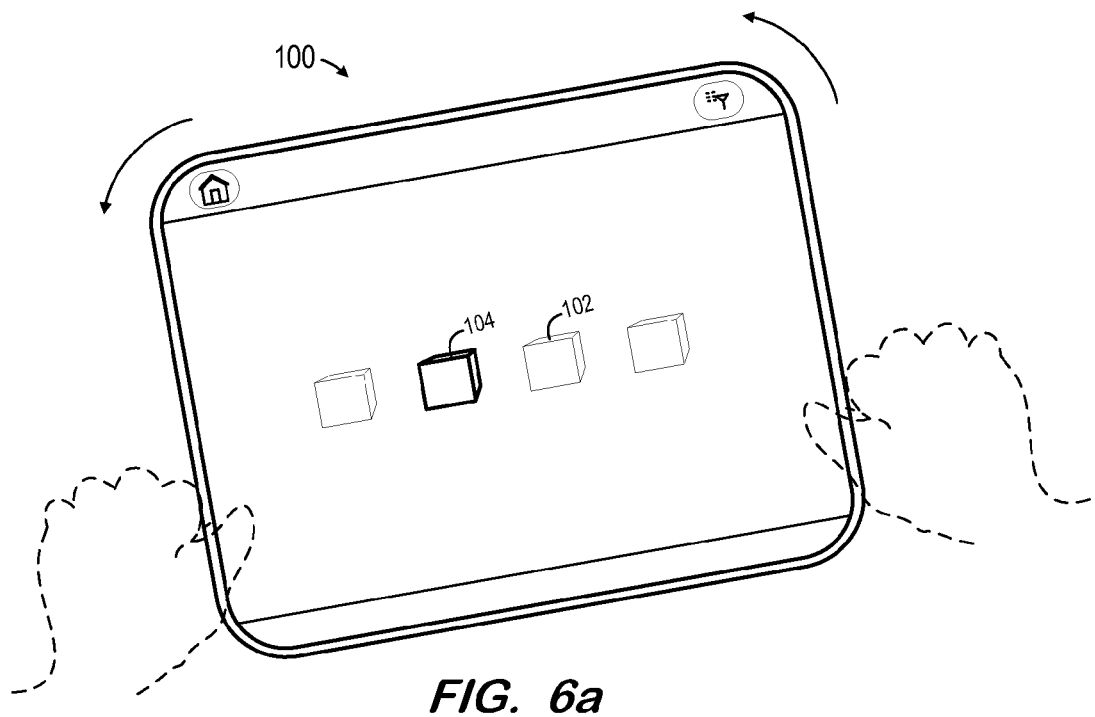
FIGS. 6a and 6b are outward views of an apparatus displaying graphical representations according to some embodiments.
Figure 6B:
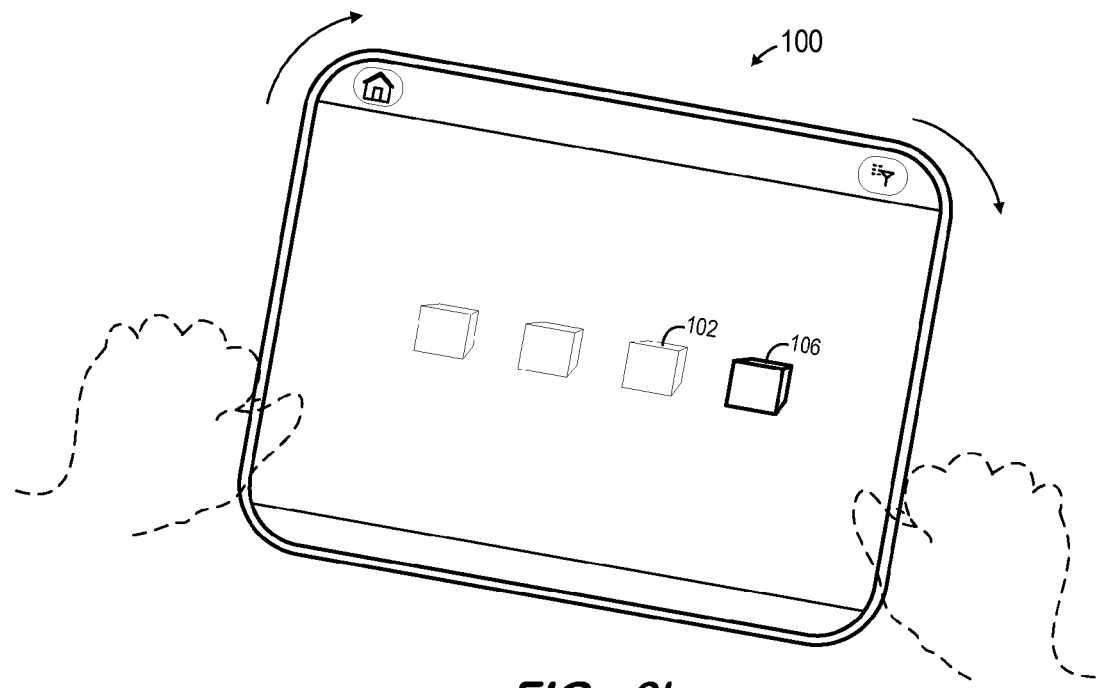

FIGS. 6a and 6b illustrate process 300 according to some embodiments. It will be assumed that, at the beginning of process 300, apparatus displays graphical representations as shown in FIG. 4. The layout of the graphical representations is determined to be a horizontal one-dimensional layout at S305. Next, at S310, it is determined to monitor clockwise and counter-clockwise rotations of apparatus 100.

FIG. 6a illustrates counter-clockwise rotation which is detected at S315. Accordingly, at S320 and as shown in FIG. 6a, representation 102 is graphically indicated as de-selected and representation 104 is graphically indicated as selected. Advantageously, such a movement and resulting action may be intuitive to the user (i.e., rotation to the left results in selection of a next-leftmost item).

In contrast, FIG. 6b illustrates counter-clockwise rotation which may be detected at S315. Accordingly, representation 102 is graphically indicated as de-selected and representation 106 is graphically indicated as selected at S320.

Figure 7A:
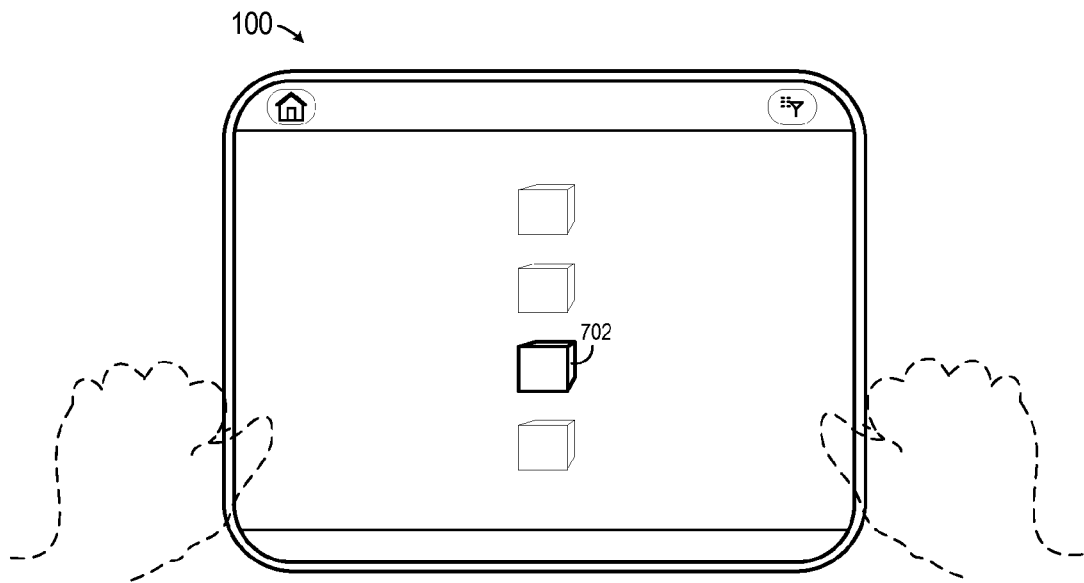
FIG. 7a is an outward view of an apparatus displaying graphical representations according to some embodiments.
Figure 7B:
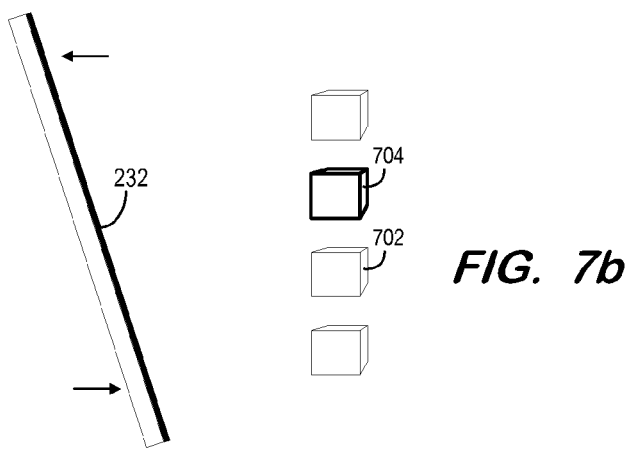
FIGS. 7b and 7c illustrate movement and corresponding displays of graphical representations according to some embodiments.
Figure 7C:
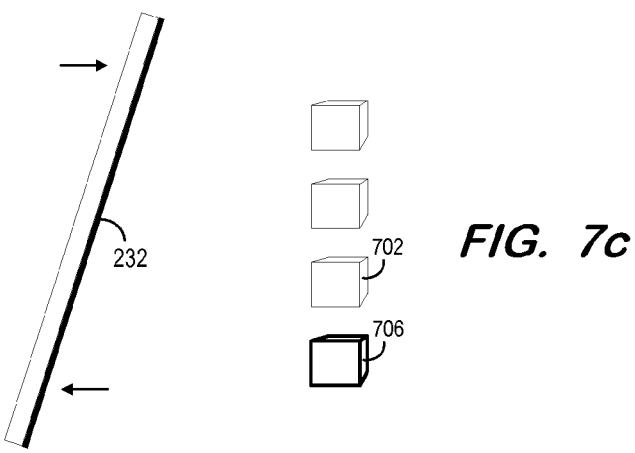

FIGS. 7a through 7c also illustrate process 300 according to some embodiments. FIG. 7a illustrates a display device of apparatus 100 displaying graphical representations, including selected graphical representation 702, prior to process 300. The layout of the graphical representations is determined to be a vertical one-dimensional layout at S305. Therefore, at S310, it is determined to monitor forward and backward tilting of apparatus 100.

FIG. 7b illustrates backward tilting (i.e., display device 232 is facing to the left in the Figure) detected at S315. Accordingly, representation 702 is graphically indicated as de-selected and representation 704 is graphically indicated as selected at S320. Similarly, FIG. 7c illustrates forward tilting which may be detected at S315. Representation 702 is therefore graphically indicated as de-selected and representation 706 is graphically indicated as selected at S320. Again, such movements and resulting actions may be intuitive to the user.

Figure 8:
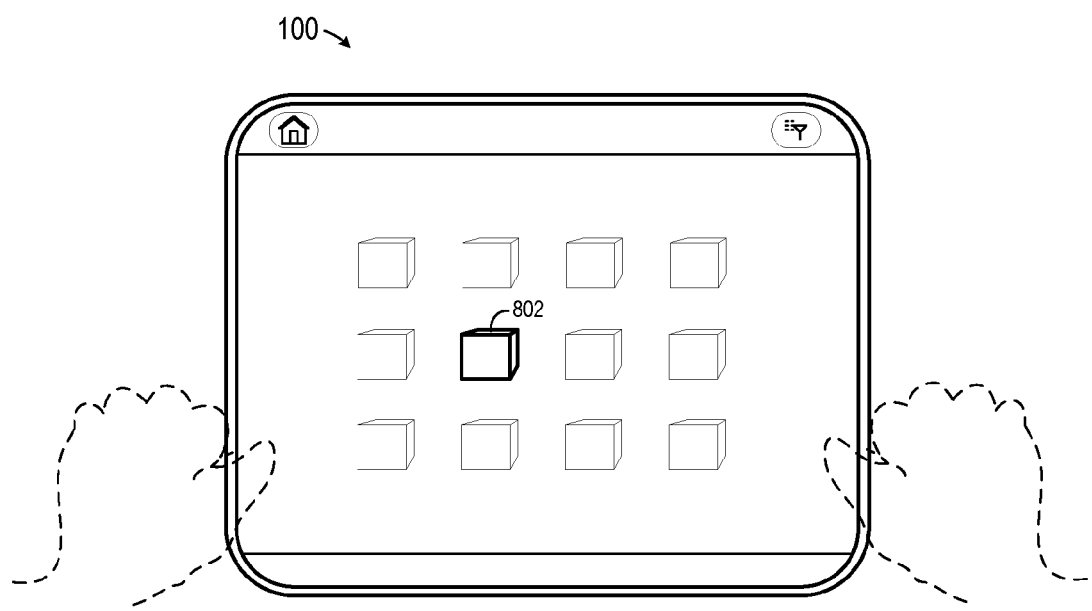
FIG. 8 is an outward view of an apparatus displaying graphical representations according to some embodiments.

FIG. 8 illustrates apparatus 100 displaying a two-dimensional layout of graphical representations of dataset members, with representation 802 indicated as selected. According to some embodiments, this layout results in the determination of clockwise, counter-clockwise, forward-tilting and backward-tilting movements to monitor at S310. FIGS. 9a, 9b, 10b and 10c illustrate these movements and resulting executed actions according to some embodiments.

Figure 9A:
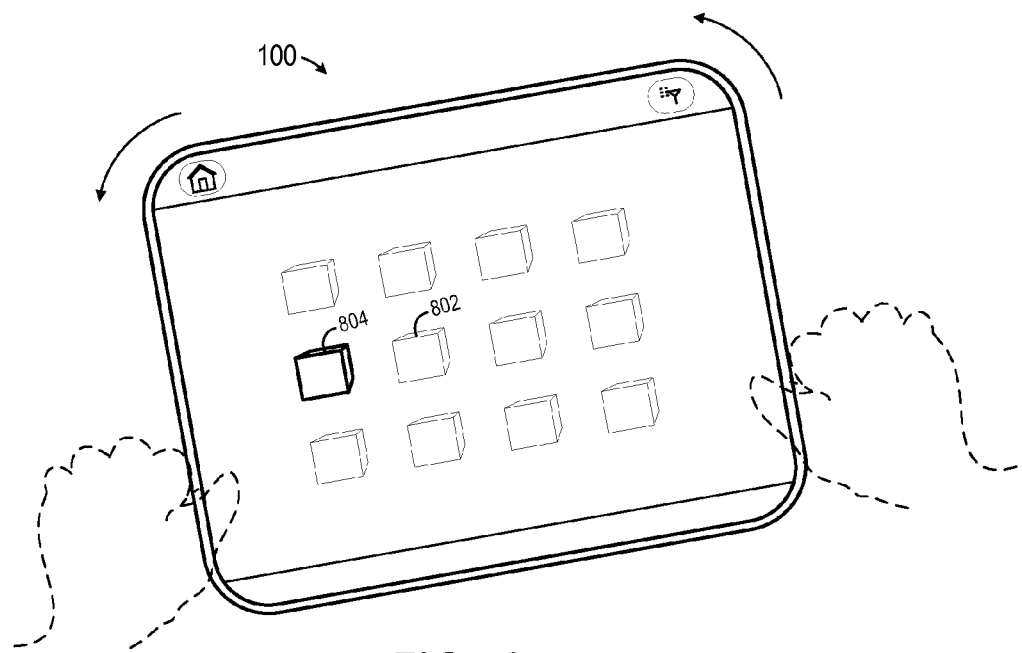
FIGS. 9a and 9b are outward views of an apparatus displaying graphical representations according to some embodiments.
Figure 9B:
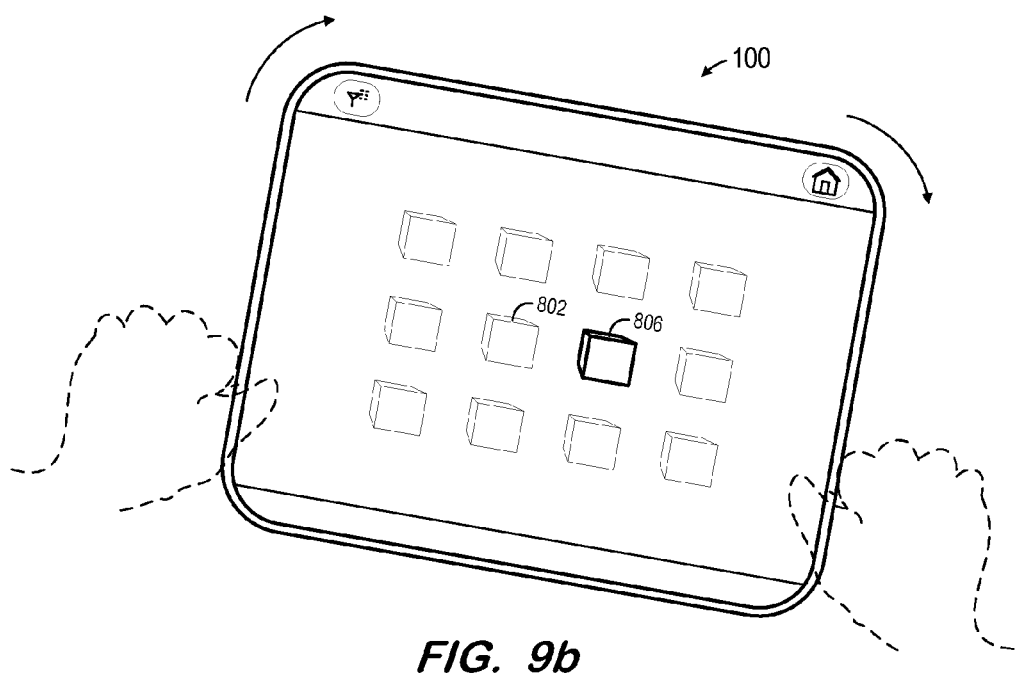

Specifically, FIG. 9a illustrates counter-clockwise rotation which is detected at S315. At S320, and as shown in FIG. 9a, representation 802 is graphically indicated as de-selected and representation 804 is graphically indicated as selected. FIG. 9b illustrates clockwise rotation which is detected at S315. As shown in FIG. 9b, representation 802 is graphically indicated as de-selected and representation 806 is graphically indicated as selected at S320.

Figure 10A:
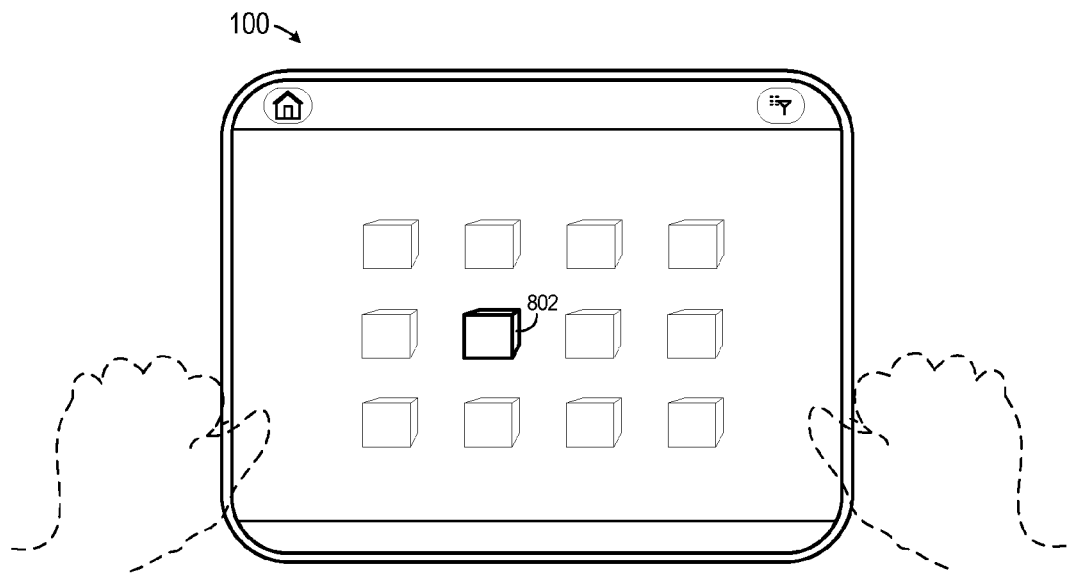
FIG. 10a is an outward view of an apparatus displaying graphical representations according to some embodiments.
Figure 10B:
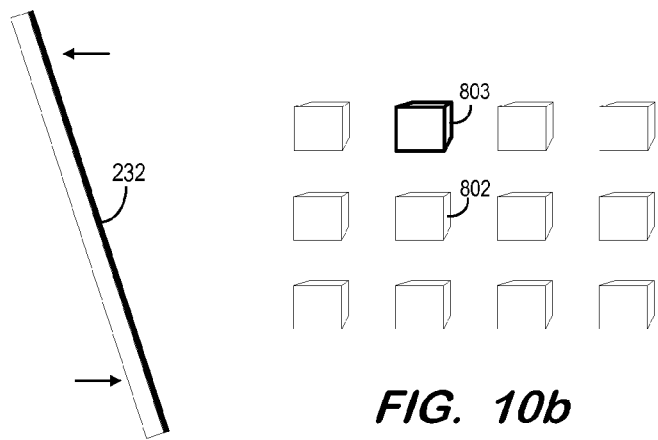
FIGS. 10b and 10c illustrate movement and corresponding displays of graphical representations according to some embodiments.
Figure 10C:
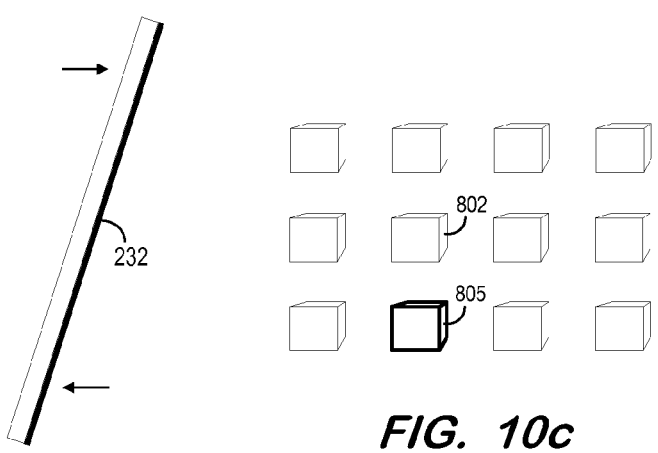

FIG. 10b illustrates backward tilting and the resulting action performed on the graphical representations of FIG. 10a. As shown in FIG. 10b, representation 802 is graphically indicated as de-selected and representation 803 is graphically indicated as selected at S320. FIG. 7c illustrates forward tilting and the resulting action performed on the graphical representations of FIG. 10a. Specifically, representation 802 is graphically indicated as de-selected and representation 805 is graphically indicated as selected at S320. The movements and resulting actions of FIGS. 9a, 9b, 10b and 10c may be intuitive to the user.

Figure 11:
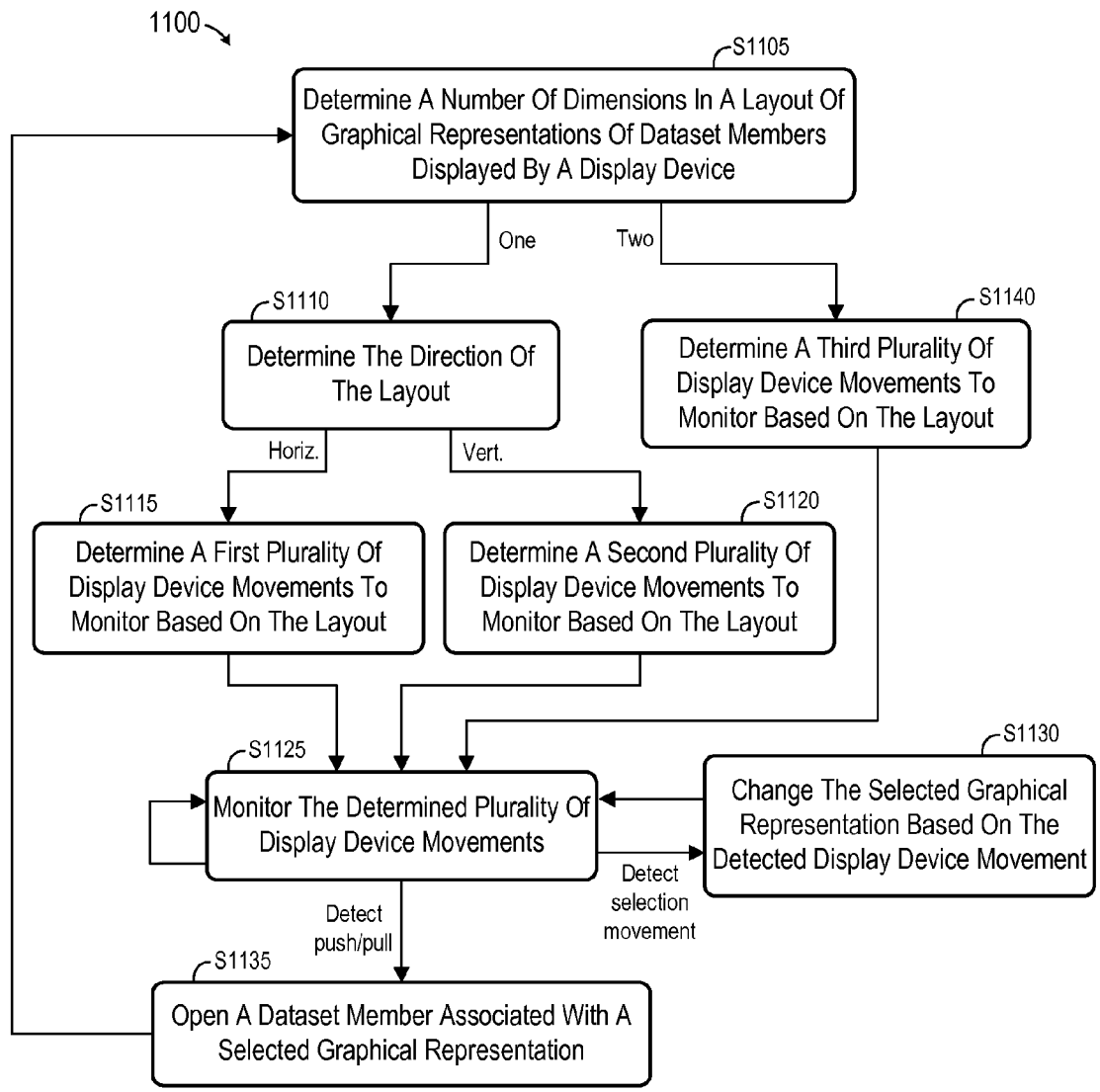
FIG. 11 is a flow diagram of a process according to some embodiments.

FIG. 11 is a flow diagram of process 1100 according to some embodiments. Process 1100 may comprise an implementation of process 300. Moreover, process 1100 may be executed to provide the functionality described above with respect to FIGS. 6a through 10c.

Initially, at S1105, a number of dimensions in a layout of graphical representations is determined. As above, the graphical representations represent dataset members and the layout is displayed by a display device.

Flow proceeds to S1110 if the layout is one-dimensional. Embodiments are not limited to the examples of "one-dimensional" provided herein. For example, a circular or other-shaped layout of graphical representations may be considered "one-dimensional" in some embodiments.

The direction of the layout is determined at S1110. Process 1100 provides for the determination of either a horizontal or a vertical direction. In this regard, a layout that is closer to horizontal than to vertical may be considered "horizontal", and a layout that is closer to vertical than to horizontal may be considered "vertical" at S1110.

Assuming a horizontal layout as shown in FIG. 4, a first plurality of display device movements to monitor are determined at S1115. According to the present embodiment, these movements consist of clockwise, counter-clockwise, "push" and "pull" movements. Push and pull movements are described below.

The determined plurality of movements are monitored at S1125. In some embodiments, only the determined plurality of movements are acted upon, and other movements are ignored. Flow proceeds to S1130 if either the clockwise movement or the counter-clockwise movement is detected.

The selected graphical representation is changed at S1130. Examples of this change are described above with respect to FIGS. 6a and 6b. Flow then returns to S1125 to continue to monitor the determined plurality of movements.

Flow continues to S1135 from S1125 upon detection of a push/pull movement. At S1135, a dataset member associated with a selected graphical representation is opened. Opening refers to a drill-down action to provide further detail regarding the dataset member.

Figure 12A:
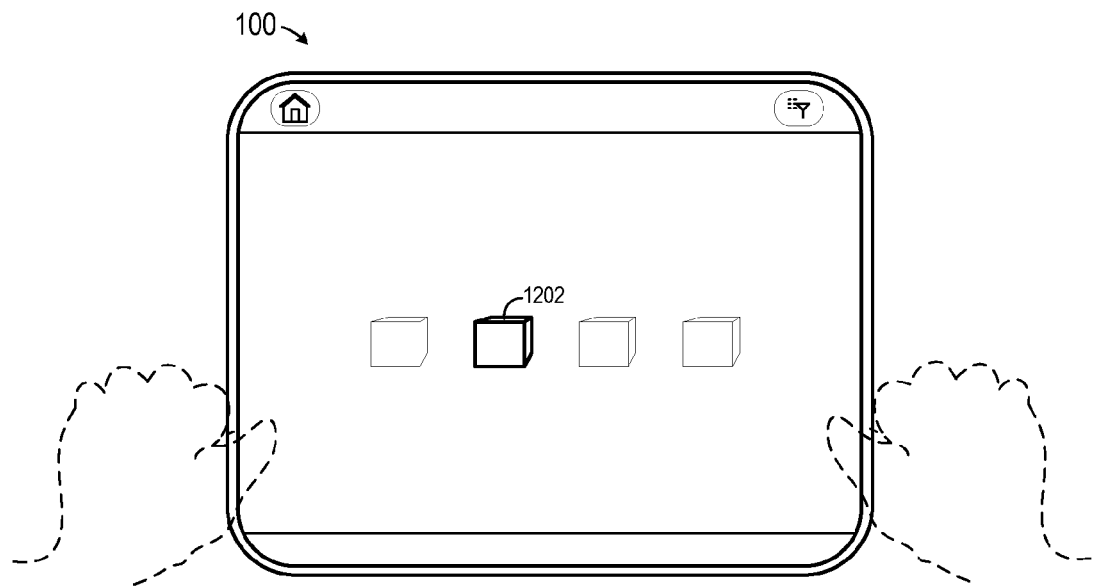
FIG. 12a is an outward view of an apparatus displaying graphical representations according to some embodiments.
Figure 12B:
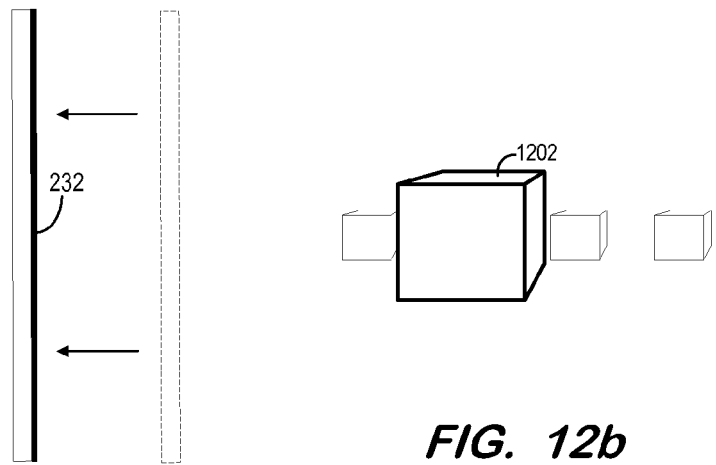
FIGS. 12b and 12c illustrate movement and corresponding displays of graphical representations according to some embodiments.

FIG. 12a shows apparatus 100 displaying a layout of graphical representations, with representation 1202 indicated as selected. FIG. 12b illustrates movement away from the user (i.e., a "push" movement) that may be detected at S1125. Consequently, and as also illustrated in FIG. 12b, the dataset member represented by representation 1202 is opened. Embodiments may employ any graphical technique for visualizing the "opening" of a dataset member.

Opening a dataset member may comprise display of a second layout of graphical representations of second dataset members, where the second dataset members are components of the opened dataset member. In such a case, flow may return from S1135 to S1105 and continue as described above.

Figure 12C:
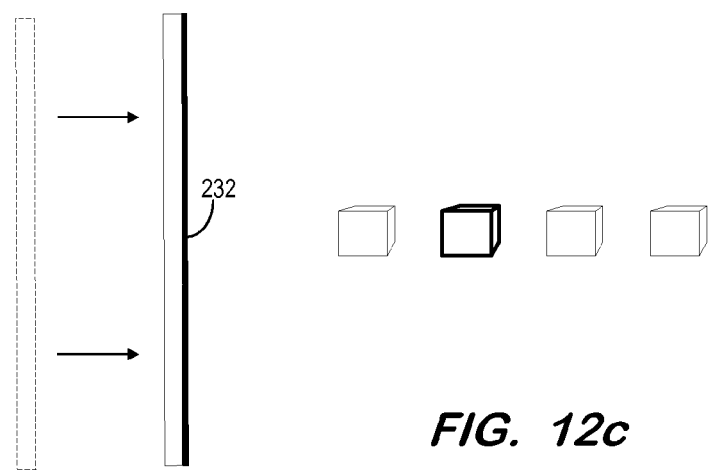

FIG. 12c illustrates movement toward the user (i.e., a "pull" movement), and subsequent "closing" of the selected dataset member according to some embodiments.

Returning to S1110, flow continues to S1120 if a vertical layout direction is determined. A second plurality of display device movements to monitor is determined at S1120. According to some embodiments, the second plurality of display device movements includes forward-tilting, backward-tilting, push and pull movements. These movements are monitored and acted upon at S1125-S1135 as described above.

Finally, if the layout is determined to be two dimensional at S1105, a third plurality of display device movements to monitor is determined at S1140. According to some embodiments, the third plurality of display device movements includes clockwise, counter-clockwise, forward-tilting, backward-tilting, push and pull movements. These movements are also monitored and acted upon at S1125-S1135 as described above.

According to the above example, the movements monitored at S1125 differ depending on the layout of the graphical representations, and may thereby provide processing efficiency and accuracy.

Figure 13:
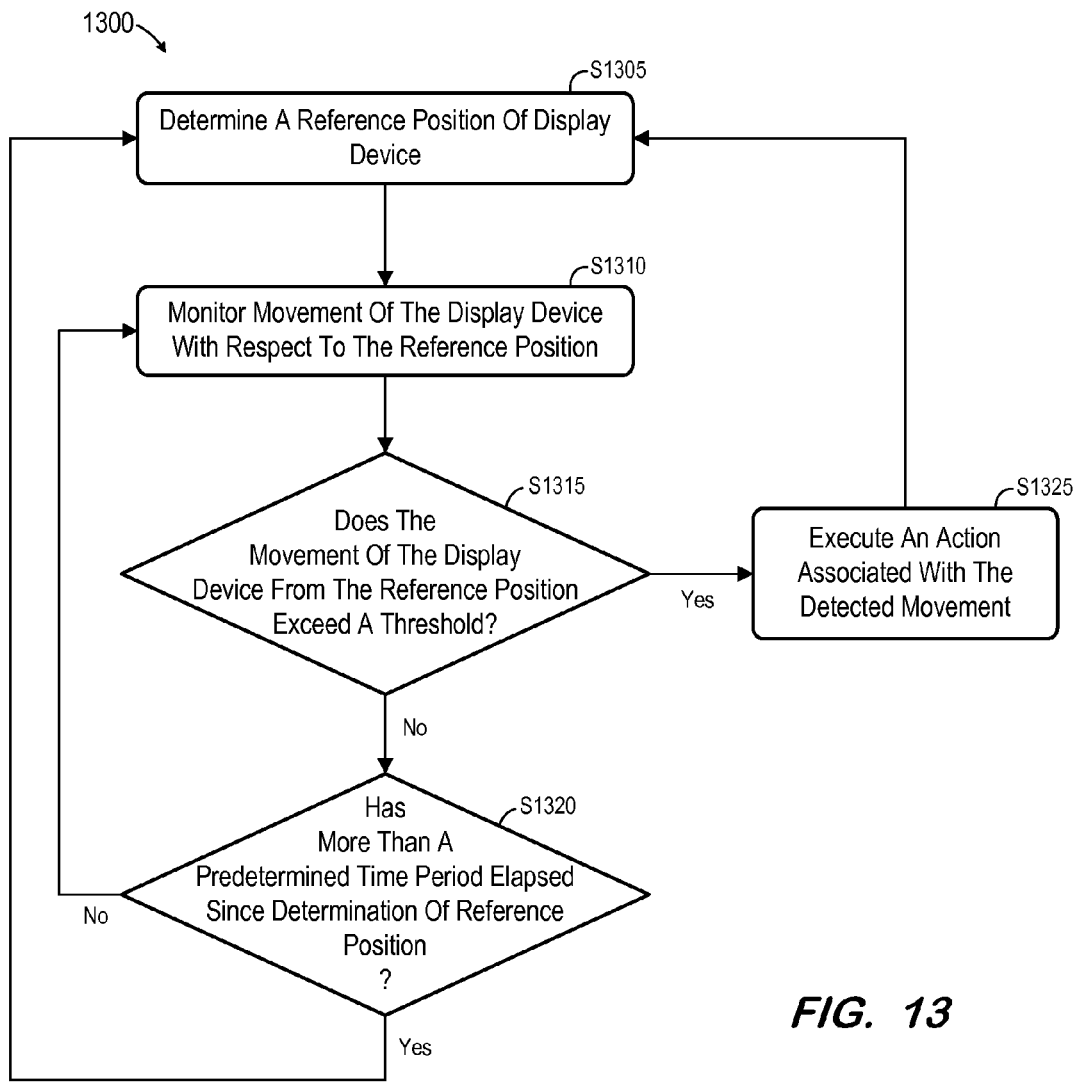
FIG. 13 is a flow diagram of a process according to some embodiments.

FIG. 13 is a flow diagram of process 1300 according to some embodiments. Process 1300 may be executed to detect device movements as described above. Some embodiments of FIG. 13 improve efficiency and accuracy of movement detection.

A reference position of a display device is determined at S1305. The reference position indicates a three-dimensional absolute position of the display device. The reference position may be determined and defined using the device's internal compass, accelerometer and/or any other technique that is or becomes known.

Next, at S1310, movement of the display device is monitored with respect to the reference position. Monitoring movement may comprise collecting data which indicates movement of the device. The monitored movement may include rotation around any axis, and translation along any axis. According to some embodiments, the collected data indicating movement is filtered at S1310.

For example, time-based low filters may be applied to remove data indicating slow device movement, since such movement might not be indicative of an intended user input. Similarly, amplitude-based low filters may be applied at S1310 to remove data indicating small device movements. Moreover, amplitude-based high filters may be applied to remove large device movements, since such movements may be indicative of changes in the user's position (e.g., standing up, sitting down) rather than intended user input.

According to some embodiments, different filters are applied at S1310 depending on the type of movement indicated by the data. For example, since a user-initiated device rotation intended to change a selected graphical representation may occur more slowly than user-initiated push or pull movements, a time-based low filter applied to data indicating rotational movement may be less selective in filtering slow movements than a time-based low filter applied to data indicating translational movement.

At S1315, it is determined whether the monitored movement as compared to the reference position, has exceeded a threshold. The threshold may comprise a particular amplitude over a particular time, and the relevant amplitude and time may differ depending on the type of movement being analyzed.

Figure 14:
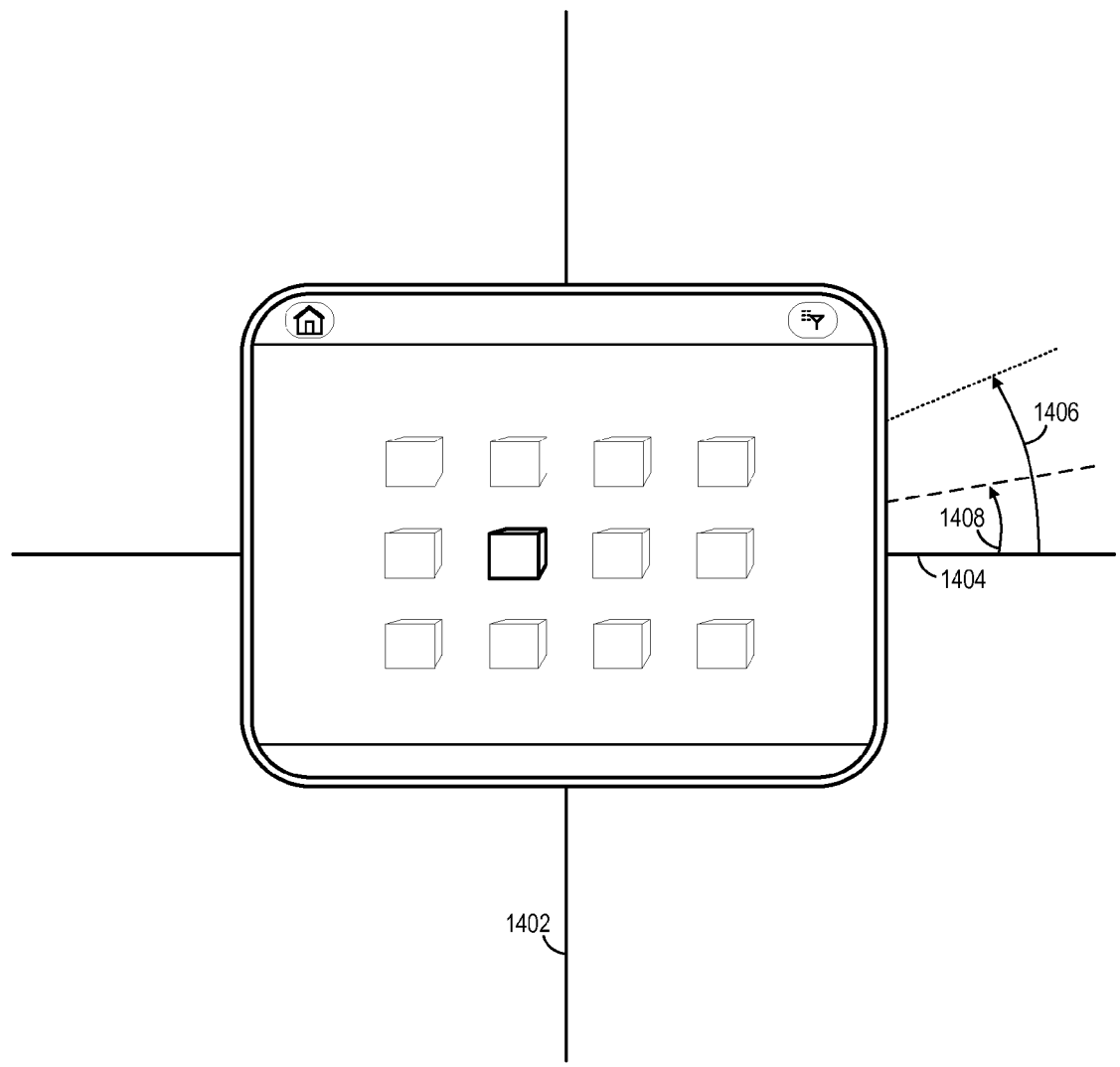
FIG. 14 illustrates movement detection according to some embodiments.

FIG. 14 illustrates movement monitoring according to some embodiments. Axes 1402 and 1404 indicate a reference position with respect to device rotation about an axis perpendicular to the drawing page. If the axes are rotated as illustrated by arrow 1406, it may be determined at S1315 that the movement has not exceeded a magnitude associated with counter-clockwise movement. Conversely, if the axes are rotated as illustrated by arrow 1408, it may be determined at S1315 that the movement has exceeded a magnitude associated with counter-clockwise movement. Flow then proceeds to S1325 to execute an associated action, such as those described above. A new reference position is then determined in S1305 and process 1300 resumes.

In the case that that the movement is determined to not exceed a magnitude associated with counter-clockwise movement, flow continues from S1315 to S1320. At S1320, it is determined whether more than a predetermined period of time (e.g., 3 s) has elapsed since the last determination of the reference position. If not, flow returns to S1310 to monitor movement of the display device with respect to the last reference position.

Figure 15:
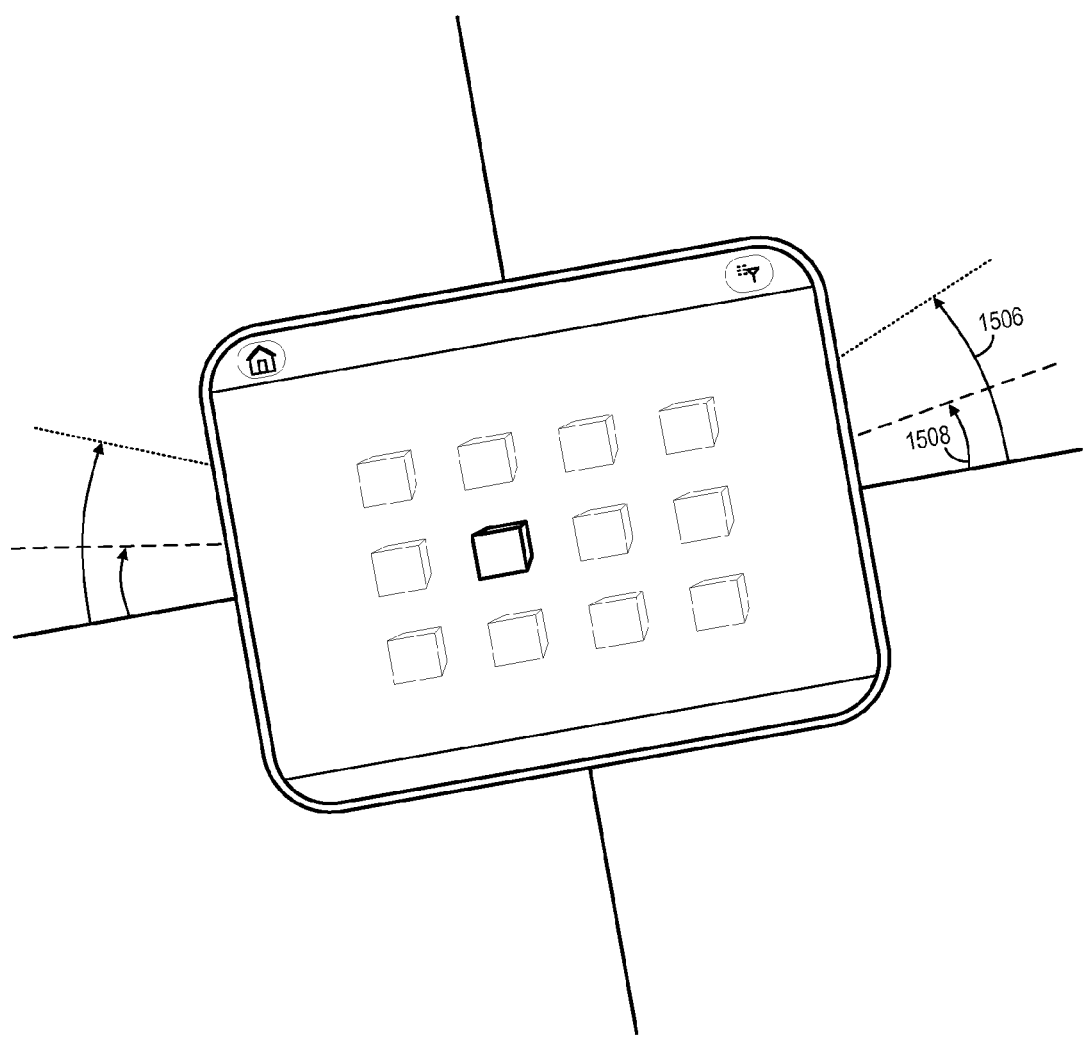
FIG. 15 illustrates movement detection according to some embodiments.

If more than the predetermined time period has passed, flow returns to S1305 to determine a new reference position. FIG. 15 illustrates a new reference position which may be determined after the reference position shown in FIG. 14. For example, the reference position has rotated counter-clockwise due to movement of the device. It should be noted that this movement, because of its speed and/or magnitude, did not exceed the threshold associated with counter-clockwise movement and therefore no action was taken on the displayed graphical representations as a result of the movement.

Process 1310 then proceeds with respect to the new reference position. In this regard, if the axes are now rotated as illustrated by arrow 1506, it may be determined at S1315 that the movement has not exceeded a magnitude associated with counter-clockwise movement, but if the axes are rotated as illustrated by arrow 1508, it may be determined at S1315 that the movement has exceeded a magnitude associated with counter-clockwise movement.

In this regard, if the axes are now rotated as illustrated by arrow 1506, it may be determined at S1315 that the movement has not exceeded a magnitude associated with counter-clockwise movement, but if the axes are rotated as illustrated by arrow 1508, it may be determined at S1315 that the movement has exceeded a magnitude associated with counter-clockwise movement.

Figure 16:
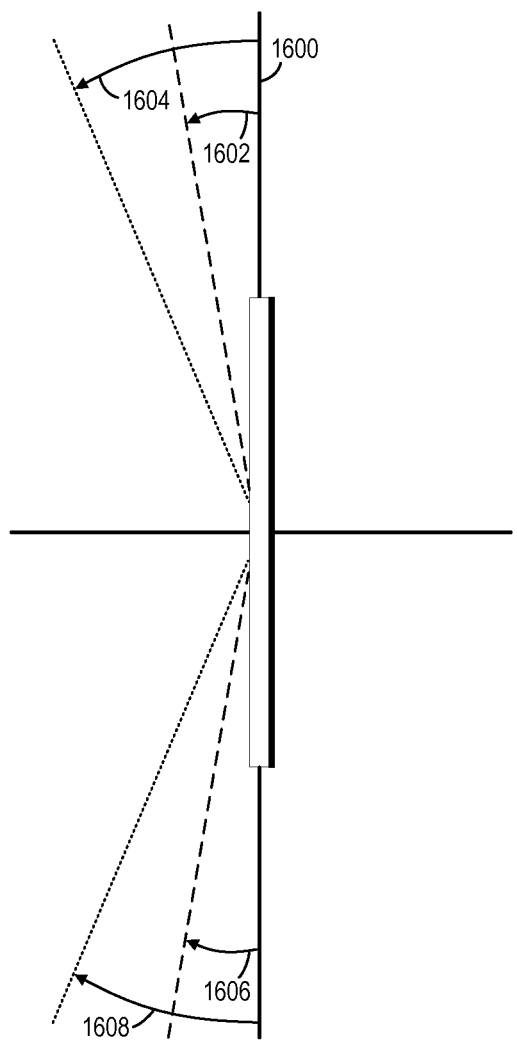
FIG. 16 illustrates movement detection according to some embodiments.

FIG. 16 illustrates the monitoring of tilting movements according to some embodiments. According to the present example, backward-tilting the device from reference position 1600 as indicated by arrow 1602 does not constitute a movement exceeding threshold parameters associated with backward tilting, while tilting the device from reference position 1600 as indicated by arrow 1604 does, resulting in execution of an associated action at S1325.

Similarly, forward-tilting the device from reference position 1600 as indicated by arrow 1606 does not constitute a movement exceeding threshold parameters associated with forward tilting, while tilting the device from reference position 1600 as indicated by arrow 1608 does, also resulting in execution of an associated action at S1325.

Figure 17:
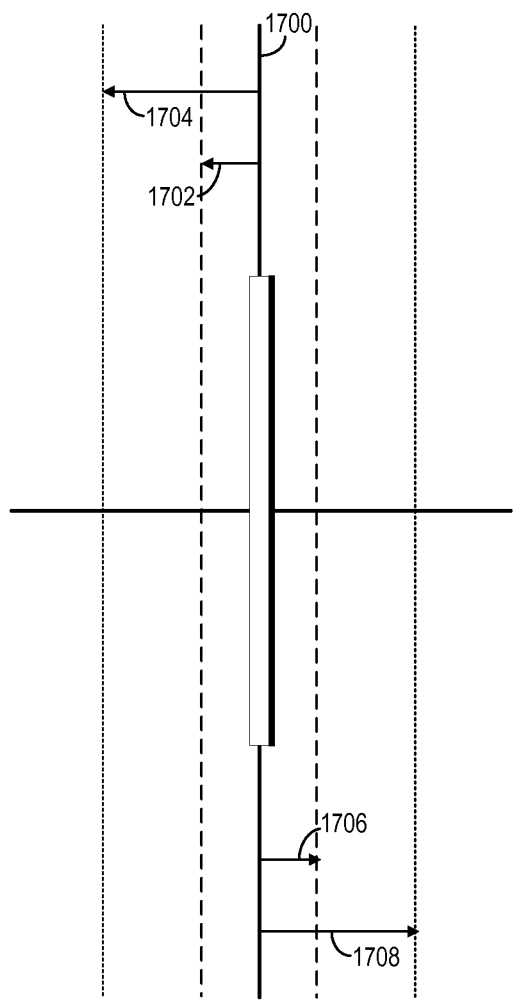
FIG. 17 illustrates movement detection according to some embodiments.

FIG. 17 illustrates the monitoring of push and pull movements according to some embodiments. Moving the device from reference position 1700 as indicated by arrow 1702 does not constitute a movement exceeding threshold parameters associated with the push movement, while moving the device from reference position 1600 as indicated by arrow 1704 exceeding such parameters in the present example, resulting in execution of an associated action at S1325.

Moving the device from reference position 1700 as indicated by arrow 1706 does not constitute a movement exceeding threshold parameters associated with the pull movement, while moving the device from reference position 1700 as indicated by arrow 1708 does, resulting in execution of an associated action at S1325.

Embodiments are not limited to the examples of movement, or to the resulting actions, described herein.

The embodiments described herein are solely for the purpose of illustration. Those in the art will recognize other embodiments may be practiced with modifications and alterations limited only by the claims.

What is claimed is:

1. An apparatus comprising:
   a display device; and
   a processor to execute program code to cause the apparatus to:
   display, on the display device, a plurality of graphical representations, each of the plurality of graphical representations representing a respective dataset member, and the plurality of graphical representations being arranged in a layout;
   determine a plurality of display device movements to monitor based on the layout;

detect one of the plurality of display device movements; and in response to the detection of the one of the plurality of display device movements, graphically indicate a deselection of a first one of the displayed graphical representations and graphically indicate a selection of a second one of the displayed graphical representations.

2. An apparatus according to claim 1, the processor to execute program code to further cause the apparatus to:

detect a second one of the plurality of display device movements; and in response to the detection of the second one of the plurality of display device movements, display a second set of graphical representations representing second dataset members, each of the second dataset members comprising a component of a dataset member associated with a currently-selected one of the graphical representations.

3. An apparatus according to claim 1, the processor further to:

display, on the display device, a second plurality of graphical representations, each of the second plurality of graphical representations representing a respective dataset member, and the second plurality of graphical representations being arranged in a second layout; and determine a second plurality of display device movements to monitor based on the second layout, wherein the second plurality of display device movements does not include at least one of the first plurality of display device movements.

4. An apparatus according to claim 1, wherein detection of the one of the plurality of display device movements comprises:

determination of a reference position of the display device;

monitoring of movement of the display device with respect to the reference position;

determination that none of the plurality of display device movements has occurred within a predetermined time period; and in response to the determination that none of the plurality of display device movements has occurred within the predetermined time period:

determination of a second reference position of the display device; and monitoring of movement of the display device with respect to the second reference position.

5. An apparatus according to claim 1, wherein determination of the layout comprises:

determination of whether the layout is one-dimensional or two-dimensional; and in a case that the layout is one-dimensional, determination of whether the layout is horizontal or vertical, and wherein determination of the plurality of display device movements comprises:

determination of a first plurality of display device movements to monitor in a case that the layout is one-dimensional and horizontal, a second plurality of display device movements to monitor in a case that the layout is one-dimensional and vertical, and a third plurality of display device movements to monitor in a case that the layout is two-dimensional.

6. A non-transitory computer-readable medium having program code stored thereon, the program code executable by a processor to cause an apparatus to:

display, on a display device, a plurality of graphical representations, each of the plurality of graphical representations representing a respective dataset member, and the plurality of graphical representations being arranged in a layout;

determine a plurality of display device movements to monitor based on the layout;

detect one of the plurality of display device movements; and in response to the detection of the one of the plurality of display device movements, graphically indicate a deselection of a first one of the displayed graphical representations and graphically indicate a selection of a second one of the displayed graphical representations.

7. A medium according to claim 6, the program code further executable by the processor to cause an apparatus to:

detect a second one of the plurality of display device movements; and in response to detection of the second one of the plurality of display device movements, display a second set of graphical representations representing second dataset members, each of the second dataset members comprising a component of a dataset member associated with a currently-selected one of the graphical representations.

8. A medium according to claim 6, the program code further executable by the processor to cause an apparatus to:

display, on the display device, a second plurality of graphical representations, each of the second plurality of graphical representations representing a respective dataset member, and the second plurality of graphical representations being arranged in a second layout; and determine a second plurality of display device movements to monitor based on the second layout, wherein the second plurality of display device movements does not include at least one of the first plurality of display device movements.

9. A medium according to claim 6, wherein detection of the one of the plurality of display device movements comprises:

determination of a reference position of the display device;

monitoring of movement of the display device with respect to the reference position;

determination that none of the plurality of display device movements has occurred within a predetermined time period; and in response to the determination that none of the plurality of display device movements has occurred within the predetermined time period:

determination of a second reference position of the display device; and monitoring of movement of the display device with respect to the second reference position.

10. A medium according to claim 6, wherein determination of the layout comprises:

determination of whether the layout is one-dimensional or two-dimensional; and in a case that the layout is one-dimensional, determination of whether the layout is horizontal or vertical, and wherein determination of the plurality of display device movements comprises: determination of a first plurality of display device movements to monitor in a case that the layout is one-dimensional and horizontal, a second plurality of display device movements to monitor in a case that the layout is one-dimensional and vertical, and a third plurality of display device movements to monitor in a case that the layout is two-dimensional.

11. A processor-implemented method comprising:

displaying, on a display device, a plurality of graphical representations, each of the plurality of graphical representations representing a respective dataset member, and the plurality of graphical representations being arranged in a layout;

determining, by the processor, a plurality of display device movements to monitor based on the layout;

detecting, by the processor, one of the plurality of display device movements; and in response to detecting the one of the plurality of display device movements, graphically indicating, on the display device, a de-selection of a first one of the displayed graphical representations and graphically indicating a selection of a second one of the displayed graphical representations.

12. A method according to claim 11, further comprising:

detecting, by the processor, a second one of the plurality of display device movements; and in response to detecting the second one of the plurality of display device movements, displaying, on the display device, a second set of graphical representations representing second dataset members, each of the second dataset members comprising a component of a dataset member associated with a currently-selected one of the graphical representations.

13. A method according to claim 11, further comprising:

displaying, on the display device, a second plurality of graphical representations, each of the second plurality of graphical representations representing a respective dataset member, and the second plurality of graphical representations being arranged in a second layout; and determining, by the processor, a second plurality of display device movements to monitor based on the second layout, wherein the second plurality of display device movements does not include at least one of the first plurality of display device movements.

14. A method according to claim 11, wherein detecting the one of the plurality of display device movements comprises:

determining, by the rocessor, a reference position of the display device;

monitoring, by the processor, movement of the display device with respect to the reference position;

determining, by the processor, that none of the plurality of display device movements has occurred within a predetermined time period; and in response to determining that none of the plurality of display device movements has occurred within the predetermined time period:

determining, by the processor, a second reference position of the display device; and monitoring, by the processor, movement of the display device with respect to the second reference position.

15. A method according to claim 11, wherein determining the layout comprises:

determining, by the processor, whether the layout is one-dimensional or two-dimensional; and in a case that the layout is one-dimensional, determining, by the processor, whether the layout is horizontal or vertical, and wherein determining the plurality of display device movements comprises:

determining, by the processor, a first plurality of display device movements to monitor in a case that the layout is one-dimensional and horizontal, a second plurality of display device movements to monitor in a case that the layout is one-dimensional and vertical, and a third plurality of display device movements to monitor in a case that the layout is two-dimensional.

* * * * *